US011822992B2

(12) United States Patent
Pheil

(10) Patent No.: US 11,822,992 B2
(45) Date of Patent: *Nov. 21, 2023

(54) MULTI-ANTENNA TUNED WEARABLE ARTICLE

(71) Applicant: NIKE, Inc., Beaverton, OR (US)

(72) Inventor: Holli Pheil, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,610

(22) Filed: Nov. 7, 2022

(65) Prior Publication Data

US 2023/0068898 A1 Mar. 2, 2023

Related U.S. Application Data

(63) Continuation of application No. 17/237,778, filed on Apr. 22, 2021, now Pat. No. 11,494,603, which is a
(Continued)

(51) Int. Cl.
*G06K 19/06* (2006.01)
*G06K 19/077* (2006.01)
(Continued)

(52) U.S. Cl.
CPC ..... *G06K 19/07762* (2013.01); *G06K 19/027* (2013.01); *G06K 19/07767* (2013.01);
(Continued)

(58) Field of Classification Search
CPC ... G06K 19/00; G06K 19/06046; G06K 19/07
(Continued)

(56) References Cited

U.S. PATENT DOCUMENTS 9,526,430 B2 * 12/2016 Srinivas ............... A61B 5/0004
10,172,423 B2 * 1/2019 Walker ................. G01L 5/0071
(Continued)

FOREIGN PATENT DOCUMENTS

CN 1441977 9/2003
CN 1658430 8/2005
(Continued)

OTHER PUBLICATIONS

"International Application Serial No. PCT US2016 026761, International Search Report dated Jul. 19, 2016", 3 pgs.
(Continued)

*Primary Examiner* — Daniel St Cyr
(74) *Attorney, Agent, or Firm* — Schwegman, Lundberg & Woessner, P.A.

(57) ABSTRACT

A wearable article, system, and method includes a structure configured to enclose a body part, a first antenna, in a first positon on or within the structure, tuned to communicate according to a wireless communication modality through air, a second antenna, in a second position on or within the structure, tuned to communicate according to the wireless communication modality through the body part, the first antenna being tuned differently than the second antenna, and a transceiver, operatively coupled to at least one of the first antenna and the second antenna, configured to communicate with an external antenna via the at least one of the first and second antennas according to the wireless communication modality.

20 Claims, 5 Drawing Sheets

Related U.S. Application Data continuation of application No. 16/369,115, filed on Mar. 29, 2019, now Pat. No. 11,010,653, which is a continuation of application No. 15/564,803, filed as application No. PCT/US2016/026761 on Apr. 8, 2016, now Pat. No. 10,318,858.

(60) Provisional application No. 62/144,773, filed on Apr. 8, 2015.

(51) Int. Cl.
| | |
|---|---|
| H04B 1/3827 | (2015.01) |
| G06K 19/02 | (2006.01) |
| H04B 5/00 | (2006.01) |
| H04L 67/12 | (2022.01) |

(52) U.S. Cl.
CPC ............ *H04B 1/385* (2013.01); *H04B 5/0062* (2013.01); *H04L 67/12* (2013.01)

(58) Field of Classification Search
USPC .............................. 235/492, 462.46, 472.02
See application file for complete search history.

(56) References Cited

U.S. PATENT DOCUMENTS

| | | | |
|---|---|---|---|
| 10,318,858 B2* | 6/2019 | Pheil | G06K 19/027 |
| 11,010,653 B2* | 5/2021 | Pheil | H04B 1/385 |
| 11,494,603 B2* | 11/2022 | Pheil | H04B 5/0062 |
| 2004/0090384 A1 | 5/2004 | Östervall | |
| 2007/0200709 A1 | 8/2007 | Naim et al. | |
| 2011/0054359 A1 | 3/2011 | Sazonov et al. | |
| 2012/0322500 A1 | 12/2012 | Charrat et al. | |
| 2014/0230563 A1 | 8/2014 | Huang | |
| 2014/0253397 A1 | 9/2014 | Converse et al. | |
| 2014/0306686 A1 | 10/2014 | Haddy | |
| 2015/0255855 A1 | 9/2015 | Tsai et al. | |
| 2018/0114106 A1 | 4/2018 | Pheil | |
| 2019/0228282 A1 | 7/2019 | Pheil | |
| 2021/0312254 A1 | 10/2021 | Pheil | |

FOREIGN PATENT DOCUMENTS

| | | |
|---|---|---|
| CN | 101292395 | 10/2008 |
| CN | 102448340 | 5/2012 |
| CN | 102510295 | 6/2012 |
| CN | 103594796 | 2/2014 |
| CN | 104319830 | 1/2015 |
| CN | 107683484 | 2/2018 |
| CN | 107683484 | 2/2022 |
| CN | 14528959 | 5/2022 |
| EP | 1269566 | 1/2003 |
| EP | 2610961 | 7/2013 |
| EP | 2768150 | 8/2014 |
| JP | 2011015395 | 1/2011 |
| WO | 2006105162 | 10/2006 |
| WO | 2016164804 | 10/2016 |

OTHER PUBLICATIONS

"International Application Serial No. PCT US2016 026761, Written Opinion dated Jul. 19, 2016", 7 pgs.
"International Application Serial No. PCT US2016 026761, International Preliminary Report on Patentability dated Oct. 19, 2017", 19 pgs.
"U.S. Appl. No. 15/564,803, Restriction Requirement dated Feb. 23, 2018", 8 pgs.
"U.S. Appl. No. 15/564,803, Response filed Apr. 16, 2018 to Restriction Requirement dated Feb. 23, 2018", 6 pgs.
"U.S. Appl. No. 15/564,803, Non Final Office Action dated May 11, 2018", 11 pgs.
"European Application Serial No. 16777415.7, Response filed May 31, 2018 to Communication Pursuant to Rules 161 and 162 EPC dated Nov. 21, 2017", 19 pgs.
"U.S. Appl. No. 15/564,803, Examiner Interview Summary dated Jul. 23, 2018", 2 pgs.
"U.S. Appl. No. 15/564,803, Response Filed Jul. 23, 2018 to Non Final Office Action dated May 11, 2018", 8 pgs.
"U.S. Appl. No. 15/564,803, Non Final Office Action dated Sep. 11, 2018", 10 pgs.
"U.S. Appl. No. 15/564,803, Examiner Interview Summary dated Nov. 19, 2018", 3 pgs.
"U.S. Appl. No. 15/564,803, Response filed Dec. 11, 2018 to Non Final Office Action dated Sep. 11, 2018", 12 pgs.
"U.S. Appl. No. 15/564,803, Notice of Allowance dated Jan. 28, 2019", 7 pgs.
"European Application Serial No. 16777415.7, Extended European Search Report dated Feb. 12, 2019", 7 pgs.
"European Application Serial No. 16777415.7, Response filed Sep. 10, 2019 to Extended European Search Report dated Feb. 12, 2019", 16 pgs.
"Chinese Application Serial No. 2016800326709, Office Action dated Jan. 9, 2020", w English translation, 23 pgs.
"U.S. Appl. No. 16/369,115, Non Final Office Action dated Mar. 6, 2020", 9 pgs.
"U.S. Appl. No. 16/369,115, Response filed May 26, 2020 to Non Final Office Action dated Mar. 6, 2020", 7 pgs.
"European Application Serial No. 16777415.7, Communication Pursuant to Article 94(3) EPC dated Jul. 6, 2020", 3 pgs.
"Chinese Application Serial No. 2016800326709, Response filed Jul. 27, 2020 to Office Action dated Jan. 9, 2020", w English claims, 38 pgs.
"U.S. Appl. No. 16/369,115, Final Office Action dated Oct. 30, 2020", 10 pgs.
"U.S. Appl. No. 16/369,115, Response filed Dec. 4, 2020 to Final Office Action dated Oct. 30, 2020", 9 pgs.
"U.S. Appl. No. 16/369,115, Examiner Interview Summary dated Dec. 8, 2020", 3 pgs.
"Chinese Application Serial No. 2016800326709, Office Action dated Nov. 26, 2020", With English machine translation, 26 pgs.
"U.S. Appl. No. 16/369,115, Advisory Action dated Dec. 30, 2020", 3 pgs.
"U.S. Appl. No. 16/369,115, Notice of Allowance dated Jan. 15, 2021", 8 pgs.
"European Application Serial No. 16777415.7, Response filed Jan. 15, 2021 to Communication Pursuant to Article 94(3) EPC dated Jul. 6, 2020", 3 pgs.
"U.S. Appl. No. 16/369,115, Notice of Allowability dated Apr. 26, 2021", 2 pgs.
"Chinese Application Serial No. 2016800326709, Response filed Apr. 9, 2021 to Office Action dated Nov. 26, 2020", w English Claims, 37 pgs.
"Chinese Application Serial No. 2016800326709, Office Action dated Apr. 25, 2021", w English translation, 11 pgs.
"U.S. Appl. No. 17/237,778, Preliminary Amendment filed Jun. 29, 2021".
"Chinese Application Serial No. 2016800326709, Response filed Sep. 2, 2021 to Office Action dated Apr. 25, 2021", w English claims, 34 pgs.
"European Application Serial No. 16777415.7, Communication Pursuant to Article 94(3) EPC dated Sep. 24, 2021", 4 pgs.
"Chinese Application Serial No. 2016800326709, Response filed Oct. 14, 2021 to Examiner Telephone Interview", w English claims, 34 pgs.
"U.S. Appl. No. 17/237,778, Non Final Office Action dated Dec. 27, 2021", 13 pgs.
"U.S. Appl. No. 17/237,778, Examiner Interview Summary dated Jan. 25, 2022", 2 pgs.
"European Application Serial No. 16777415.7, Response filed Mar. 25, 2022 to Communication Pursuant to Article 94(3) EPC dated Sep. 24, 2021", 12 pgs.
"U.S. Appl. No. 17/237,778, Response filed Apr. 27, 2022 to Non Final Office Action dated Dec. 27, 2021", 10 pgs.
"U.S. Appl. No. 17/237,778, Notice of Allowance dated Jul. 6, 2022", 8 pgs.

(56) References Cited

OTHER PUBLICATIONS

"European Application Serial No. 16777415.7, Response to Communication Under Rule 71(3) filed Jul. 3, 2023", 19 pgs.
"Chinese Application Serial No. 202210086647.5, Office Action dated Jul. 26, 2023", With English machine translation, 19 pages.

* cited by examiner

MULTI-ANTENNA TUNED WEARABLE ARTICLE

RELATED APPLICATION

This application is a continuation application of U.S. patent application Ser. No. 17/237,778, filed Apr. 22, 2021, which application is a continuation of U.S. patent application Ser. No. 16/369,115, filed Mar. 29, 2019, issued on May 18, 2021 as U.S. Pat. No. 11,010,653, which application is a continuation of U.S. patent application Ser. No. 15/564,803, filed Oct. 6, 2017, now issued on Jun. 11, 2019 as U.S. Pat. No. 10,318,858, which application is a U.S. National Stage Filing under 35 U.S.C. 371 from International Patent Application Serial No. PCT/US2016/026761, filed Apr. 8, 2016, published on Oct. 13, 2016 as WO 2016/164804 A1, which application claims the benefit of priority to U.S. Provisional Patent Application Ser. No. 62/144,773, filed Apr. 8, 2015, all of which are hereby incorporated by reference herein in their entireties.

TECHNICAL FIELD

The subject matter disclosed herein generally relates to wearable articles configured for active communication while being worn.

BACKGROUND

Ultra high frequency (UHF) wireless communication may vary in operation frequency between and among certain countries, but in general may be understood to occur over the range of approximately 300 megahertz (MHz) to approximately three (3) gigahertz (GHz). Certain regions throughout the world utilize a variety different of industrial, scientific, and medical (ISM) bands for UHF communications. Certain ISM bands are centered around approximately 900 MHz, with the center frequencies of those bands falling generally within the range of approximately 869 MHz to approximately 915 MHz.

BRIEF DESCRIPTION OF THE DRAWINGS

Some embodiments are illustrated by way of example and not limitation in the figures of the accompanying drawings.

DETAILED DESCRIPTION

Figure 1:
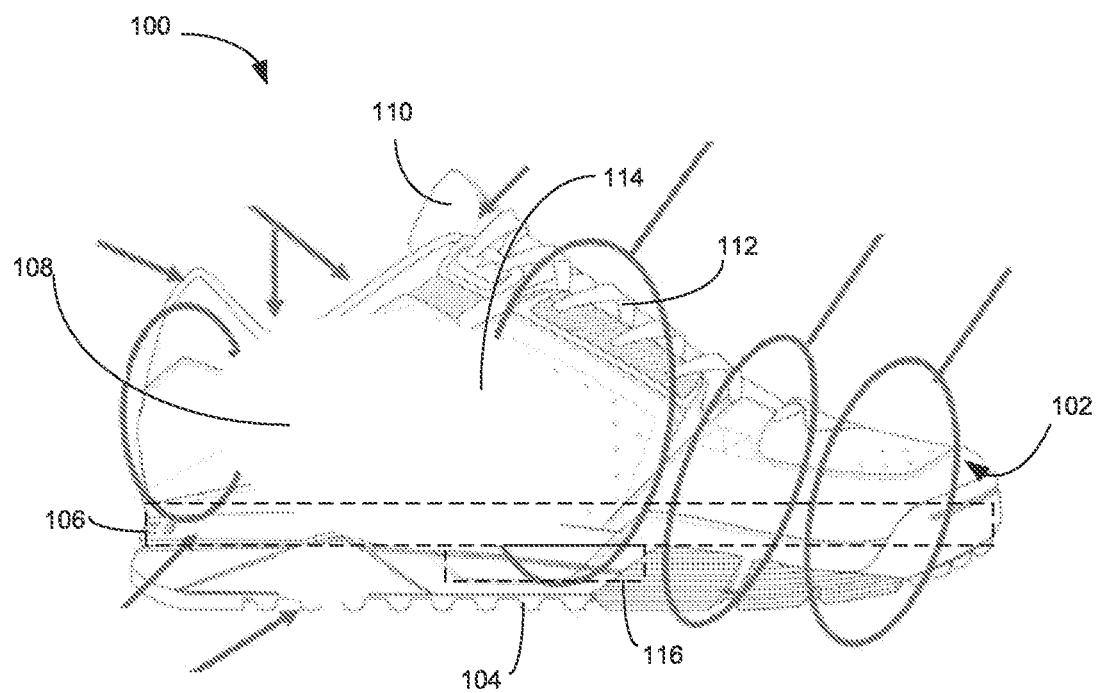
FIG. 1 is a cutaway depiction of a wearable article, in an example embodiment.

Example methods and systems are directed to wearable articles configured for active UHF communication while being worn. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The ISM bands and other regional and international communication bands clustered around approximately 900 MHz (herein after "the 900 MHz bands") may be useful in a variety of circumstances, including but not limited to radio frequency identification (RFID) tags, chips, and the like, as known in the art. However, various substances and materials, including water and other constituent parts of humans, animals, and clothing, among other things, may be impermeable or otherwise inhibiting of wireless signals in the 900 MHz bands that are normally tuned for transmission through air. Thus, while RFID tags, for instance, have been utilized in conjunction with articles of apparel such as clothes, shoes, and the like, such RFID tags or other wireless transmitters in the 900 MHz bands may be of substantially reduced range and effectivity while the wearable article is actually being worn on a person's body.

An RFID tag with a UHF antenna that is positioned in a shirt, for instance, may communicate to a suitable range in directions away from the body of the wearer of the shirt but may not communicate in directions that pass through the wearer. An RFID tag in a shoe may be effectively unable to communicate at all while the shoe is being worn if the tag is in the sole or heel of the shoe. Even if the RFID tag is positioned higher in the shoe, such as in the tongue, effective communication may still be limited both by the presence of the foot and the proximity of the tag to the ground. Circumstances in which RFID tags are attached to a shoe intentionally place the RFID at a distinct distance from the foot of the wearer to maintain the ability to communicate at an effective distance.

Actions taken to tune a UHF antenna to communicate effectively through a human body may, however, reduce the effectivity of the UHF antenna when the wearable article is not being worn by a person. Additionally, the circumstances of wearing the wearable article may place the UHF antenna away from the body, in the case of an overly-large shirt, for instance. Thus, to tune the antenna to the body of the wearer may result in reduced effectiveness under the circumstances in which the wearable article isn't being worn.

Wearable articles have been developed that provide multiple antennas for wireless communication. A first antenna is a UHF antenna for communication in the 900 MHz bands that is not tuned to the presence of an animal body. A second antenna is a UHF antenna for communication in the 900 MHz bands that is tuned to the presence of an animal body, such as that of a human or other mammal. In various examples, only the body-tuned UHF antenna is included. In further examples, a third antenna is tuned to communicate in bands around 13.5 MHz or according to other wireless communication standards. In various examples, only the second and third antennas are included. The various antennas may be controlled and either actively or passively coordinated to prevent interference between one another by a single transmitter circuit.

FIG. 1 is a depiction of a wearable article 100, including components contained within the wearable article 100 and not necessarily visible from perspective illustrated, in an example embodiment. As illustrated, the wearable article 100 is an article of footwear, specifically a shoe. However, it is to be understood that while the principles described herein are with specific reference to the wearable article 100, the principles described herein may be applied to any suitable wearable article, without limitation to additional wearable articles disclosed herein.

The wearable article 100 includes a structure 102 including an outsole 104 designed to come into contact with a surface, such as the ground or a floor, an insole 106 configured to seat a human foot, an upper section 108 configured to enclose the human foot, and a tongue 110 configured to facilitate securing the wearable article 100 to the human foot via laces 112. The outsole 104 and/or the insole 106 may be configured within a middle section 114 to seat and secure the arch of a human foot. It is to be recognized that this is a simplified depiction of a conventional article of footwear and that various articles of footwear may incorporate any of a variety of components or features. Further, certain articles of apparel 100 may not incorporate all of these features or may include these features in other formats (e.g., a sandal may incorporate the outsole 104 and a reconfigured upper section 106 and no insole 106, tongue 110, and laces 112). It is contemplated that the principles disclosed herein will be applicable and adaptable to any of a range of wearable articles 100.

The wearable article 100 further includes a radio frequency ("RF") communication circuit 116. The RF communication circuit 116 may incorporate some conventional features of RFID tags known in the art as well as the various features disclosed herein. As illustrated, the RF communication circuit 116 is positioned within the middle section 114, seated within and enclosed by the outsole 104. However, in various examples the RF communication circuit 116 may be positioned between the outsole 104 and insole 106, within and enclosed by the insole 106, within the upper section 108, such as on a side of the wearable article, or within the tongue 110.

Figure 2:
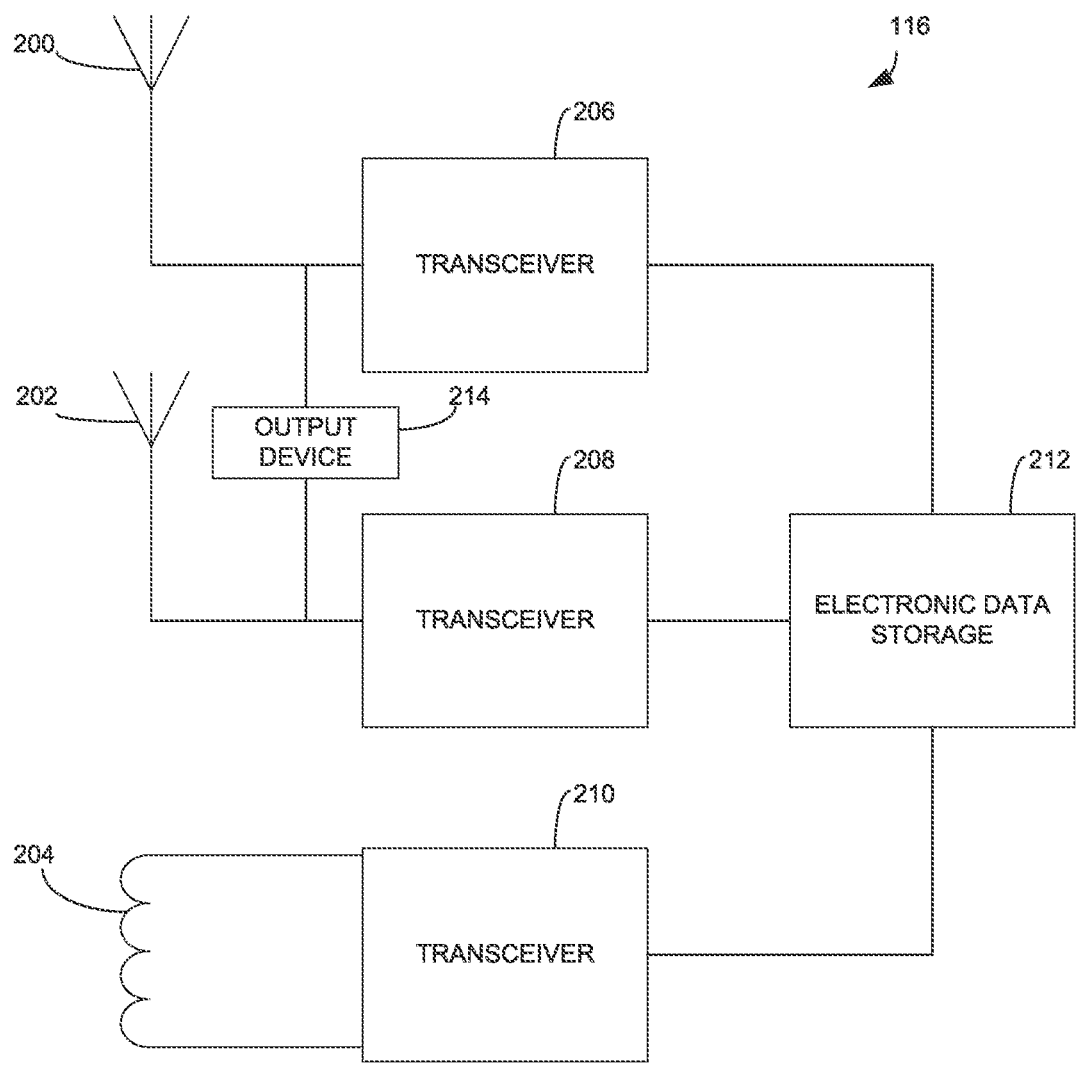
FIG. 2 is a block diagram of an RF communication circuit, in an example embodiment.

FIG. 2 is a block diagram of an RF communication circuit 116, in an example embodiment. In the illustrated example, the RF communication circuit 116 is or includes a tri-port antenna, including: a first antenna 200 that is tuned to transmit UHF signals effectively through air; a second antenna 202 that is tuned to transmit UHF signals effectively through a human body (see, e.g., Santiago et al, "Broadband UHF RFID Passive Tag Antenna for Near-Body Applications", *IEEE Antennas and Wireless Propagation Letters, Vol.* 12, (2013), pp. 136-139, incorporated herein by reference in its entirety); and a third antenna 204 that is configured to communicate according to a different wireless modality than that of the first and second antennas 200, 202, such as according to near field communication (NFC) at approximately 13.5 MHz, such as according to any one or more standards including ISO14443B, ISO1443A NFC Type 4, and ISO 15693 (including contemporary and previous versions of those standards as well as versions of those standards that are yet to be promulgated or adopted). In various examples, the first and second antennas 200, 202 communicate according to a UHF standard, including any one or more of Gen2 or ISO18000-6C (again including versions of those standards that are past, current, or that may be developed). In various examples, only the first and second antennas 200, 202 are incorporated. In an example, only one of the antennas 200, 202, 204 is incorporated.

The first antenna 200 is positioned in a first position on or within the structure 102. In an example, the first position is on the RF communication circuit 116 substrate. The second antenna 202 is positioned in a second position on or within the structure 102. In an example, the second position is on the RF communication circuit 116 substrate as well. In such examples, the first and second positions may be understood to be the same, common position, though it is to be understood that the first and second antennas 200, 202 may still be physically separated. The third antenna 204 is positioned in a third position on or within the structure. In the example provided above, the third position may be on the tongue 110 of the wearable article 100 or in any other suitable location.

The RF communication circuit 116 further includes first, second, and third transceivers 206, 208, 210 each individually coupled to a respective one of the antennas 200, 202, 204. Each transceiver 206, 208, 210 may include componentry such as a voltage rectifier and a modulator as appropriate for the respective antenna 200, 202, 204. The transceivers 206, 208, 210 are coupled to an electronic data storage 212, such as an electrically erasable programmable read-only memory ("EEPROM") circuit. In various implementations, individual ones of the transceivers 206, 208, 210 may be combined, with a single transceiver, such as the transceiver 206, providing transmitting and receiving functionality for multiple antennas. In an example, the single transceiver 206 is coupled to and configured to be a transceiver for UHF signals for both of the first and second antennas 200, 202, and the second transceiver 208 may be omitted. In an example, a single transceiver 206 provides transmitting and receiving functionality for all three antennas 200, 202, 204. Further, the individual transceivers 206, 208, 210 may be understood to form a single, unified transceiver for the RF communication circuit 116 as a whole, albeit with discrete componentry configured to provide the various wireless communication modalities disclosed herein.

More generally, the first and second antennas 200, 202 are configured to receive wireless signals transmitted according to a first wireless communication modality, such as UHF. The differences in the physical characteristics of the first and second antennas 200, 202 with respect to one another make the antennas tuned to the first wireless communication modality in different environments, such as through the air and through the body, as disclosed herein. The third antenna 204 is configured to receive wireless signals transmitted according to a second wireless communication modality different than the first wireless communication modality, such as NFC.

The RF communication circuit 116 as illustrated is a passive RF communication circuit 116 and, as a result, draws energy from received RF signals rather than an internal power supply, such as a battery. However, various examples of the RF communication circuit 116 may be active and incorporate an internal power source and relatively power intensive componentry not illustrated herein.

The antennas 200, 202, 204 as illustrated are in close proximity of one another, in various examples with less than two centimeters of separation between the antennas 200, 202, 204, and in various examples less than one centimeter of separation. In an example illustrated herein, the antennas 200, 202, 204 are screen printed on a single substrate or are printed on multiple substrates that are nevertheless located in the same part of the wearable article 100. In various alternative examples, one or more of the antennas 200, 202, 204 are discrete components that may be spatially separate or separated from one another. In an illustrative and non-limiting example, the first and second antennas 200, 202 may be located in the same part of the wearable article 100, such as the middle section 114 as illustrated, while the third antenna may be located in the tongue 110 and operatively coupled to the transceiver 210 via a conductor. In various examples, the antennas 200, 202, 204 may be sited on the wearable article in an advantageous position for that individual antenna 200, 202, 204.

The electronic data storage 212 includes or is configured to include information about the wearable article and/or a person associated with the wearable article. The information about the wearable article 100 may include, without limitation, a make and model of the wearable article 100, a size of the wearable article 100, and information that may be utilized to prove the authenticity of the wearable article 100, such as a coded serial number. Such information may be coded in to the electronic data storage 212 at a time of manufacture or later in a supply chain. The information about the wearable article 100 may further include information which may be transmitted and written to the electronic data storage 212 at or after a point of sale, including a date and location of sale. The information about a person may be transmitted and written to the electronic data storage at or after a point of sale and may include a name or other information about a purchaser of the wearable article 100, an intended recipient of the wearable article 100, or a person to whom the wearable article 100 has been transferred.

The RF communication circuit 116 optionally includes or is coupled to an output device 214. The output device 214 is configured to produce a visual (e.g., a light), aural (e.g., a human-perceptible sound), or other detectable output dependent on whether or not the first antenna 200 and/or the second antenna 202 has received enough energy to conduct wireless communications. As such, the output of the output device 214 provides an indication of which one or both of the first and second antennas 200, 202 is engaged in wireless communication. The output device 214 may produce a different output dependent on which of the antennas 200, 202 is receiving the communication, such as with a different color light, a different light pattern, a different sound tone, and the like, to enable an observer to know which antenna 200, 202 is engaged in wireless communication.

While the output device 214 is depicted as being coupled directly between the antennas 200, 202 and their respective transceivers 206, 208, it is noted that the output device 214 may be coupled on the opposite side of the transceiver 206, 208 from the antennas 200, 202, or anywhere within or coupled to the RF communication circuit 116 while still permitting a signal to be transmitted to the output device 214 indicative of the receipt of communications by one or both of the antennas 200, 202.

While the RF communication circuit 116 is described with respect to a passive RF communication system. However, it is to be recognized and understood that the principles disclosed herein may readily applied to active systems on the wearable article 100, including those with a power source and/or embedded processor.

Figure 3:
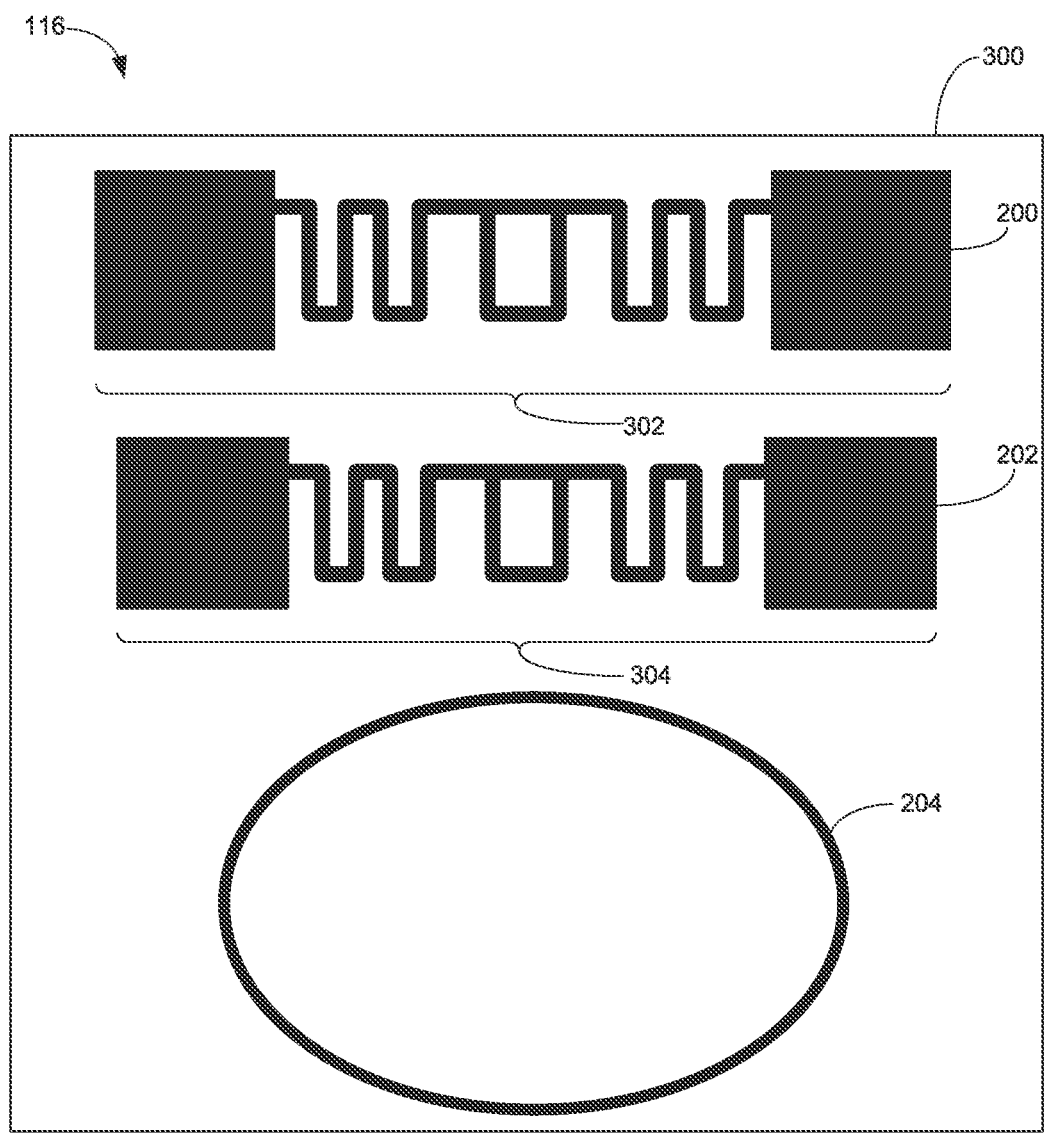
FIG. 3 is a layout of an RF communication circuit on a substrate, in an example embodiment.

FIG. 3 is a layout of the RF communication circuit 116 on a substrate 300, in an example embodiment. The RF communication circuit 116 as illustrated includes all three antennas 200, 202, 204 disclosed herein. It is noted that particular implementations may vary depending on the precise standards by which the various antennas 200, 202, 204 communicate. Furthermore, as disclosed herein, the antennas 200, 202, 204 may not necessarily be included on the substrate 200 but rather may be coupled to the remaining componentry of the RF communication circuit 116.

In the illustrated example, the antennas 200, 202, 204 are silver or copper traces screen printed on the substrate 300. In such an example, the substrate 300 is substantially flexible, though various implementations provide for a substantially rigid substrate 300. Additionally, the antennas 200, 202, 204 may be disposed on or otherwise coupled to the substrate according to any suitable method or mechanism known or that may be developed and may be formed of any of a variety of suitable materials known or that may be developed.

As illustrated, the first and second antennas 200, 202 are air-tuned and body-tuned, respectively, based on differences in their respective lengths 302, 304 and/or other physical properties of the antennas 200, 202. In an example, the first antenna 200 is a WT-A522 UHF antenna by FUJITSU Group. The antennas 200, 202 may be understood to be tuned to any particular environment or medium such that physical properties of the antenna 200, 202 are selected or varied to increase or optimize one or more aspect of antenna performance within the particular environment or medium. Thus, for instance, the first antenna 200, which is tuned for transmission through air, may have a higher signal strength, lower signal loss, higher data rate, and/or greater range through air than through other environments or media, such as through a human body. In an example, the signal characteristics of the first antenna 200 are the same or substantially the same through air as the signal characteristics of the second antenna 202 through the human body.

In various examples, in addition to being tuned for air and body, respectively, the first and second antennas 200, 202 are also tuned to the structure 102 of the wearable article 100. It is noted that the structure 102 may be different for particular implementations of the wearable article 100 and that, to tune the first and second antennas 200, 202, analysis may be made of the structure 102 and adjustments made to the characteristics of the antennas 200, 202 according to that analysis. Factors of the structure 102 may include materials, curves or irregularities in the contours of the structure, and the like.

The third antenna 204 may similarly be tuned to communicate through the body, though it is noted that implementations disclosed herein and that may be utilized for the third antenna 204 may not benefit from tuning to the body. In particular, communication at 13.5 MHz may not be susceptible or overly susceptible to interference from the human body or the structure 102 of the wearable article. Thus, in such circumstances, tuning of the third antenna 204 to the body may be superfluous. In an example, the third coil 204 is an ellipsoid having dimensions of 1.5 and 3.0 centimeters. In an alternative example, the third antenna 204 is a twenty-five (25) millimeter diameter wet inlay NXP ICODE SLIX coil by IDENTIV, Inc. However, various implementations of the third antenna 204 and frequencies at which the third antenna 204 transmits and receives may benefit from tuning for a body or the structure 102 of the wearable article 100, in which case the principles disclosed herein with respect to the first and second antennas 200, 202.

The RF communication circuit 116 is included in one or more circuits coupled, attached, laminated, or otherwise secured to the substrate 300. In an example, the RF communication circuit 116 is an application-specific integrated circuit (ASIC). In various examples, the RF communication circuit 116 includes multiple ASICs, with the transceivers 206, 208, 210 variously split between and among two or more ASICs. In an example, one ASIC includes the first transceiver 206 and a second ASIC includes the second transceiver 208, while the third transceiver 210 may either be included in the ASIC of the first or second transceivers 206, 208 or be a component of a separate, third ASIC. The electronic data storage 212 may be incorporated onto one ASIC and accessed by the various transceivers 206, 208, 210, may be split between and among the individual ASICs, or may be a separate component coupled to each of the ASICs. While ASICs are discussed with particularity, it is to be recognized and understood that the RF communication circuit 116 may be implemented on or with any suitable electronics.

Figure 4:
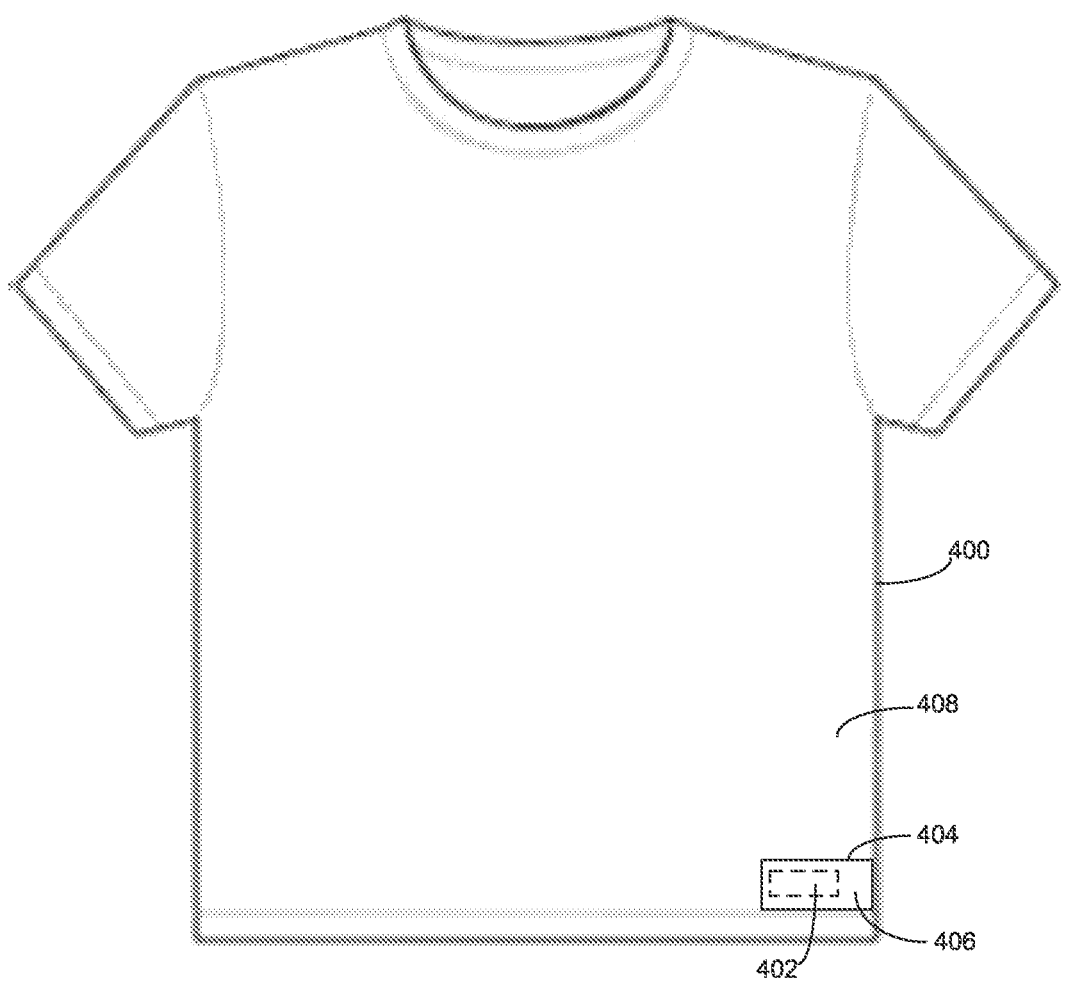
FIG. 4 is a depiction of a wearable article including an RF communication circuit, in an example embodiment.

FIG. 4 is a depiction of a wearable article 400 including an RF communication circuit 402, in an example embodiment. In the illustrated example, the wearable article 400 is a shirt, though it is emphasized that the wearable article 400 may be any suitable article of apparel, article of footwear, or other suitable article. The RF communication circuit 402 may be the RF communication circuit 116, may incorporate some components of the RF communication circuit 116, or may be designed according to the principles disclosed in detail herein.

The wearable article 400 includes an information tag 404 on or in which at least a portion of the RF communication circuit 402 is positioned. The information tag 404 may be sewn, glued, or otherwise secured to the wearable article 400. The information tag 404 includes visually-accessible information related to the wearable article 400, such as, but not necessarily limited to, a make and model of the wearable article 100, a size of the wearable article 100, and information that may be utilized to prove the authenticity of the wearable article 100, such as a coded serial number. As such, the visual information provided by the information tag 404 may be the same or similar to the wireless information provided by the RF communication circuit 116. The visual information may also include logos related to the manufacturer or brand of the wearable article 400, an organization, such as a sport team or league, related to decorative elements of the wearable article 400, and the like.

In various examples, not all of the antennas 200, 202, 204 are included in the wearable article 400. In an example, only the first antenna 200 and the second antenna 202 are included. In an example, only the second antenna 202 and the third antenna 204 are included. In an example, only the first antenna 200 and the third antenna 204 are included.

The RF communication circuit 402 may be secured, at least in part, to the information tag 404 by be sewn onto a surface 406 of the information tag 404. The surface 406 may be not be externally visible to a viewer of the wearable article 400 and may be between the information tag 404 and a structure 408 of the wearable article 400, e.g., a textile of the shirt. Alternatively, the information tag 404 may have an internal volume in which the RF communication circuit 402 may be secured, e.g., where two textile elements form a pocket in which the RF communication circuit 402 may be placed. Further alternatively, one or more of the antennas 200, 202, 204 of the RF communication circuit 402 may be formed form conductive thread or other material and sewn into the information tag 404 itself.

Figure 5:
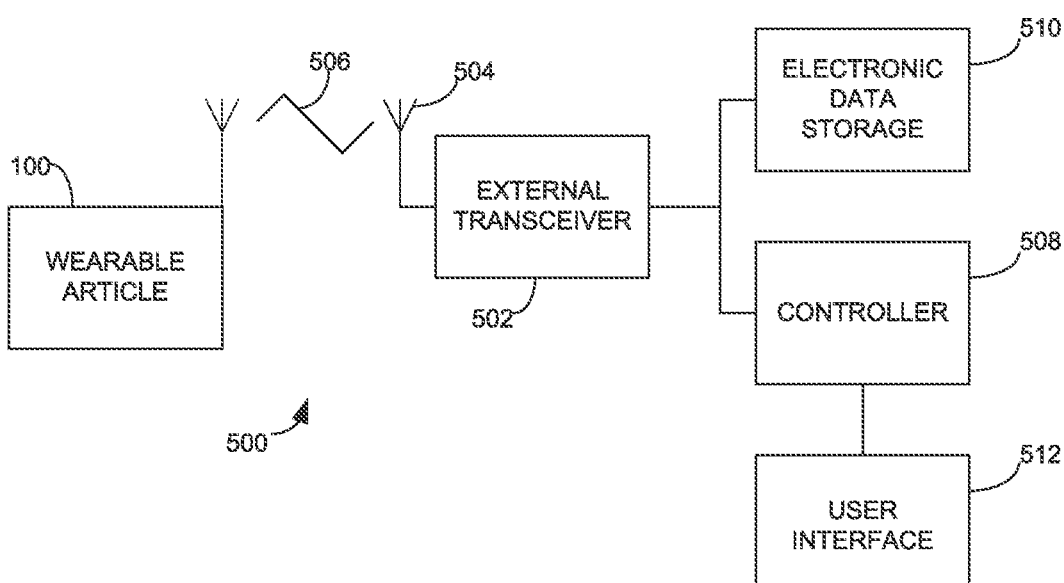
FIG. 5 is a block diagram of a system for transmitting wireless signals to a wearable article, in an example embodiment.

FIG. 5 is a block diagram of a system 500 for transmitting wireless signals to a wearable article 100, in an example embodiment. While the wearable article 100 will be referenced with respect to the system 500, it is noted that the wearable article 400 or any suitable wearable article with an air-tuned antenna and a body-tuned antenna may be utilized instead.

The system 500 includes an external transceiver 502 and external antenna 504 configured to transmit and receive wireless signals 506 to at least one of the antennas 200, 202, 204 according to at least one wireless modality. In various examples, the external transceiver 502 includes multiple individual transceivers configured to transmit according to the first and second wireless modalities disclosed herein. In various examples, the external antenna 504 includes multiple individual antennas configured to transmit and receive the wireless signals 506 according to the first and second wireless modalities.

The system 500 further includes a controller 508 configured to control operation of the external transceiver 502, including by providing information for transmittal to the wearable article 100 and to receive information provided by the wearable article 100. As such, the controller 508 may receive information about the wearable article 100 and information about a person associated with the wearable article 100. The controller 508 is optionally coupled to one or more of an external electronic data storage 510 and a user interface 512, which may, respectively, be configured to store the information received from the wearable article 100 and present the information received form the wearable article 100 to a user.

Figure 6:
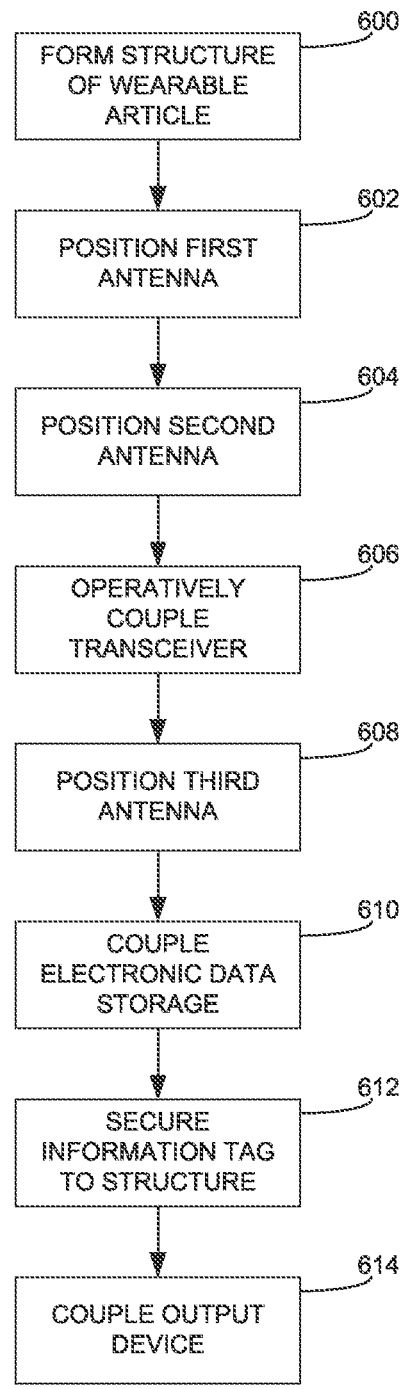
FIG. 6 is a flowchart for making a wearable article, in an example embodiment.

FIG. 6 is a flowchart for making a wearable article, in an example embodiment. The method may be utilized for making one or both of the wearable articles 100, 400 or any other suitable wearable article.

At 600, a structure of a wearable article is formed to enclose a body part.

At 602, a first antenna is positioned in a first positon on or within the structure, the first antenna tuned to communicate according to a wireless communication modality through air.

At 604, a second antenna is positioned in a second position on or within the structure, the second antenna tuned to communicate according to the wireless communication modality through the body part, the first antenna being tuned differently than the second antenna. In an example, the first and second antennas are further tuned to communicate according to the wireless communication modality through the structure of the article of footwear in addition to through air and the human foot, respectively.

At 606, a transceiver is operatively coupled to at least one of the first antenna and the second antenna, the transceiver configured to communicate with an external antenna via the at least one of the first and second antennas according to the wireless communication modality. In an example, the wireless communication modality is a first wireless communication modality and the first wireless communication modality is an ultra high frequency (UHF) communication modality and wherein the second wireless communication modality is at least one of a near field communication (NFC) modality and an ISO 15693 modality. In an example, the transceiver comprises a first transceiver, wherein operatively coupling the transceiver comprises operatively coupling the first transceiver to the first antenna, the first transceiver configured to communicate according to the wireless communication modality via the first antenna and a second transceiver, wherein operatively coupling the transceiver comprises operatively coupling the second transceiver to the second antenna, the second transceiver configured to communicate according to the wireless communication modality via the second antenna.

In an example, the first and second antennas and the transceiver are disposed on a common substrate, the first and second positions are a common position, and positioning the first antenna and positioning the second antenna comprise positioning the substrate in the common position. In an example, the first and second antennas are discrete components with respect to one another and the first and second positions are separate with respect to one another.

At 608, a third antenna is positioned in a third position on or within the structure and coupled to the transceiver, the third antenna tuned to a second wireless communication modality different than the first wireless communication modality. In an example, the structure comprises a tongue of an article of footwear, and wherein the third position is on or within the tongue. In an example, the structure comprises an outsole and an insole and wherein the first, second, and third positions and the transceiver are at least one of within the outsole and between the outsole and the insole. In an example, the transceiver comprises a first transceiver, wherein operatively coupling the transceiver comprises operatively coupling the first transceiver to the first and second antennas, the first transceiver configured to communicate according to the first wireless communication modality via the first and second antennas, and a second transceiver, wherein operatively coupling the transceiver comprises operatively coupling the second transceiver to the third antenna, the third transceiver configured to communicate according to the second wireless communication modality via the third antenna.

At 610, an electronic data storage is operatively coupled to the transceiver, the electronic data storage configured to store information about at least one of the wearable article; and a person associated with the wearable article.

At 612, an information tag is secured to the structure, wherein positioning the first antenna and positioning the second antennas comprise securing the first and second antennas, at least in part, to the information tag. In an example, the information tag includes visual information related to the article of apparel, and wherein the transceiver is configured to transmit wireless information related to the article of apparel, the wireless information including at least some information included in the visual information. In an example, securing the third antenna includes securing the third antenna to the information tag. In an example, the information tag includes visual information related to the article of apparel, and wherein the transceiver is configured to transmit wireless information related to the article of apparel, the wireless information including at least some information included in the visual information.

At 614, an output device is coupled to the first and second antennas, the output device configured to provide a first indication if the first antenna receives a wireless signal and a second indication if the second antenna receives a wireless signal. In an example, the first and second indications are at least one of a visual indication and an audio indication.

Examples

Examples of articles, systems, and methods disclosed herein are presented without limitation.

In Example 1, a wearable article includes a structure configured to enclose a body part, a first antenna, in a first positon on or within the structure, tuned to communicate according to a wireless communication modality through air, a second antenna, in a second position on or within the structure, tuned to communicate according to the wireless communication modality through the body part, the first antenna being tuned differently than the second antenna, and a transceiver, operatively coupled to at least one of the first antenna and the second antenna, configured to communicate with an external antenna via the at least one of the first and second antennas according to the wireless communication modality.

In Example 2, the wearable article of Example 1 optionally further includes that the wireless communication modality is a first wireless communication modality and further comprising a third antenna, in a third position on or within the structure and coupled to the transceiver, tuned to a second wireless communication modality different than the first wireless communication modality.

In Example 3, the wearable article of any one or more of Examples 1 and 2 optionally further includes that the first wireless communication modality is an ultra high frequency (UHF) communication modality and wherein the second wireless communication modality is at least one of a near field communication (NFC) modality and an ISO 15693 modality.

In Example 4, the wearable article of any one or more of Examples 1-3 optionally further includes that the wearable article is an article of footwear, wherein the structure comprises a tongue, and wherein the third position is on or within the tongue.

In Example 5, the wearable article of any one or more of Examples 1-4 optionally further includes that the structure comprises an outsole and an insole and wherein the first, second, and third positions and the transceiver are at least one of within the outsole and between the outsole and the insole.

In Example 6, the wearable article of any one or more of Examples 1-5 optionally further includes that the transceiver comprises a first transceiver, coupled to the first and second antennas, configured to communicate according to the first wireless communication modality via the first and second antennas and a second transceiver, coupled to the third antenna, configured to communicate according to the second wireless communication modality via the third antenna.

In Example 7, the wearable article of any one or more of Examples 1-6 optionally further includes that the transceiver comprises a first transceiver, coupled to the first antenna, configured to communicate according to the wireless communication modality via the first antenna and a second transceiver, coupled to the second antenna, configured to communicate according to the wireless communication modality via the second antenna.

In Example 8, the wearable article of any one or more of Examples 1-7 optionally further includes that the first and second antennas and the transceiver are disposed on a common substrate, the first and second positions are a common position, and the substrate is positioned in the common position.

In Example 9, the wearable article of any one or more of Examples 1-8 optionally further includes that the first and second antennas are discrete components with respect to one another and the first and second positions are separate with respect to one another.

In Example 10, the wearable article of any one or more of Examples 1-9 optionally further includes an electronic data storage, operatively coupled to the transceiver, configured to store information about at least one of the wearable article; and a person associated with the wearable article.

In Example 11, the wearable article of any one or more of Examples 1-10 optionally further includes that the first and second antennas are further tuned to communicate according to the wireless communication modality through the structure of the article of footwear in addition to through air and the human foot, respectively.

In Example 12, the wearable article of any one or more of Examples 1-11 optionally further includes an information tag secured to the structure, wherein the first and second antennas are secured, at least in part, to the information tag.

In Example 13, the wearable article of any one or more of Examples 1-12 optionally further includes that the information tag includes visual information related to the article of apparel, and wherein the transceiver is configured to transmit wireless information related to the article of apparel, the wireless information including at least some information included in the visual information.

In Example 14, the wearable article of any one or more of Examples 1-13 optionally further includes that the wireless communication modality is a first wireless communication modality and further comprising a third antenna, secured, at least in part, to the information tag and coupled to the transceiver, the third antenna tuned to a second wireless communication modality different than the first wireless communication modality.

In Example 15, the wearable article of any one or more of Examples 1-14 optionally further includes that the information tag includes visual information related to the article of apparel, and wherein the transceiver is configured to transmit wireless information related to the article of apparel, the wireless information including at least some information included in the visual information.

In Example 16, the wearable article of any one or more of Examples 1-15 optionally further includes an output device, coupled to the first and second antennas, configured to provide a first indication if the first antenna receives a wireless signal and a second indication if the second antenna receives a wireless signal.

In Example 17, the wearable article of any one or more of Examples 1-16 optionally further includes that the first and second indications are at least one of a visual indication and an audio indication.

In Example 18, a method includes forming a structure configured to enclose a body part, positioning a first antenna in a first positon on or within the structure, the first antenna tuned to communicate according to a wireless communication modality through air, positioning a second antenna in a second position on or within the structure, the second antenna tuned to communicate according to the wireless communication modality through the body part, the first antenna being tuned differently than the second antenna, and operatively coupling a transceiver to at least one of the first antenna and the second antenna, the transceiver configured to communicate with an external antenna via the at least one of the first and second antennas according to the wireless communication modality.

In Example 19, the method of Example 18 optionally further includes that the wireless communication modality is a first wireless communication modality and further comprises positioning a third antenna in a third position on or within the structure and coupled to the transceiver, the third antenna tuned to a second wireless communication modality different than the first wireless communication modality.

In Example 20, the method of any one or more of Examples 18 and 19 optionally further includes that the first wireless communication modality is an ultra high frequency (UHF) communication modality and wherein the second wireless communication modality is at least one of a near field communication (NFC) modality and an ISO 15693 modality.

In Example 21, the method of any one or more of Examples 18-20 optionally further includes that the structure comprises a tongue of an article of footwear, and wherein the third position is on or within the tongue.

In Example 22, the method of any one or more of Examples 18-21 optionally further includes that the structure comprises an outsole and an insole and wherein the first, second, and third positions and the transceiver are at least one of within the outsole and between the outsole and the insole.

In Example 23, the method of any one or more of Examples 18-22 optionally further includes that the transceiver comprises a first transceiver, wherein operatively coupling the transceiver comprises operatively coupling the first transceiver to the first and second antennas, the first transceiver configured to communicate according to the first wireless communication modality via the first and second antennas; and a second transceiver, wherein operatively coupling the transceiver comprises operatively coupling the second transceiver to the third antenna, the third transceiver configured to communicate according to the second wireless communication modality via the third antenna.

In Example 24, the method of any one or more of Examples 18-23 optionally further includes that the transceiver comprises a first transceiver, wherein operatively coupling the transceiver comprises operatively coupling the first transceiver to the first antenna, the first transceiver configured to communicate according to the wireless communication modality via the first antenna; and a second transceiver, wherein operatively coupling the transceiver comprises operatively coupling the second transceiver to the second antenna, the second transceiver configured to communicate according to the wireless communication modality via the second antenna.

In Example 25, the method of any one or more of Examples 18-24 optionally further includes that the first and second antennas and the transceiver are disposed on a common substrate, the first and second positions are a common position, and positioning the first antenna and positioning the second antenna comprise positioning the substrate in the common position.

In Example 26, the method of any one or more of Examples 18-25 optionally further includes that the first and second antennas are discrete components with respect to one another and the first and second positions are separate with respect to one another.

In Example 27, the method of any one or more of Examples 18-26 optionally further includes operatively coupling an electronic data storage to the transceiver, the electronic data storage configured to store information about at least one of the wearable article; and a person associated with the wearable article.

In Example 28, the method of any one or more of Examples 18-27 optionally further includes that the first and second antennas are further tuned to communicate according to the wireless communication modality through the structure of the article of footwear in addition to through air and the human foot, respectively.

In Example 29, the method of any one or more of Examples 18-28 optionally further includes securing an information tag to the structure, wherein positioning the first antenna and positioning the second antennas comprise securing the first and second antennas, at least in part, to the information tag.

In Example 30, the method of any one or more of Examples 18-29 optionally further includes that the information tag includes visual information related to the article of apparel, and wherein the transceiver is configured to transmit wireless information related to the article of apparel, the wireless information including at least some information included in the visual information.

In Example 31, the method of any one or more of Examples 18-30 optionally further includes that the wireless communication modality is a first wireless communication modality and further comprises securing a third antenna, at least in part, to the information tag and coupled to the transceiver, the third antenna tuned to a second wireless communication modality different than the first wireless communication modality.

In Example 32, the method of any one or more of Examples 18-31 optionally further includes that the information tag includes visual information related to the article of apparel, and wherein the transceiver is configured to transmit wireless information related to the article of apparel, the wireless information including at least some information included in the visual information.

In Example 33, the method of any one or more of Examples 18-32 optionally further includes coupling an output device to the first and second antennas, the output device configured to provide a first indication if the first antenna receives a wireless signal and a second indication if the second antenna receives a wireless signal.

In Example 34, the method of any one or more of Examples 18-33 optionally further includes that the first and second indications are at least one of a visual indication and an audio indication.

In Example 35, a system includes the wearable article of any one or more of Examples 1-17 and optionally further includes an external transceiver coupled to an external antenna configured to communication according to the wireless communication modality.

In Example 36, the system of Example 35 optionally further includes that the external antenna is configured to communicate according to at least one of the first and second wireless communication modalities.

In Example 37, the system of any one or more of Examples 35 and 36 optionally further include one or more of an electronic data storage, a controller, and a user interface operatively coupled to the external transceiver.

As used herein, the term "memory" refers to a machine-readable medium able to store data temporarily or permanently and may be taken to include, but not be limited to, random-access memory (RAM), read-only memory (ROM), buffer memory, flash memory, ferroelectric RAM (FRAM), and cache memory. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A wearable article, comprising:
   a structure configured to enclose a body part of a wearer, the body part different than the structure;
   a first antenna, laid out in a first position on or within the structure, the first antenna configured to emit and receive wireless signals and laid out to transmit and receive according to a wireless communication modality through air, the first position configured to allow the first antenna to transmit and receive trough air;
   a second antenna, laid out in a second position on or within the structure, the second antenna configured to emit and receive wireless signals and laid out to transmit and receive according to the wireless communication modality through the body part, the first antenna being tuned differently than the second antenna, the second position spaced apart from the first position and configured to allow the second antenna to transmit and receive trough the body part; and
   a transceiver, disposed on or within the structure and operatively coupled the first antenna and the second antenna, the transceiver configured to selectively cause one of the first antenna and the second antenna to communicate with an external antenna of an external system by transmitting and receiving data via the at least one of the first and second antennas according to the wireless communication modality, wherein the transceiver is configured to receive information from the external system and transmit information to the external system.

2. The wearable article of claim 1, wherein the wireless communication modality is one of an ultra high frequency (UHF) communication modality, a near field communication (NFC) modality, or an ISO 15693 modality.

3. The wearable article of claim 1, wherein the transceiver comprises:
   a first transceiver, coupled to the first antenna, configured to transmit and receive according to the wireless communication modality via the first antenna; and
   a second transceiver, coupled to the second antenna, configured to transmit and receive according to the wireless communication modality via the second antenna.

4. The wearable article of claim 1, wherein the first and second antennas and the transceiver are disposed on a common substrate, the first and second positions are a common position, and the substrate is positioned in the common position.

5. The wearable article of claim 1, wherein the first and second antennas are discrete components with respect to one another and the first and second positions are separate with respect to one another.

6. The wearable article of claim 1, wherein the information is about at least one of: the wearable article; or a person associated with the wearable article.

7. The wearable article of claim 1, wherein the first and second antennas are further tuned to transmit and receive according to the wireless communication modality through the structure of the article of footwear in addition to through air and the human foot, respectively.

8. The wearable article of claim 1, wherein the information includes visual information related to the article of apparel.

9. The wearable article of claim 1, wherein the structure comprises an upper for an article of footwear and a sole structure, wherein the first and second antennas are positioned on or within the sole structure and the transceiver is positioned on or within the sole structure.

10. The wearable article of claim 1, further comprising an output device, coupled to the first and second antennas, configured to provide a first indication if the first antenna receives a wireless signal and a second indication if the second antenna receives a wireless signal.

11. The wearable article of claim 10, wherein the first and second indications are at least one of a visual indication and an audio indication.

12. A method of making a wearable article, comprising:
  forming a structure to enclose a body part of a wearer, the body part different than the structure;
  laying out a first antenna in a first position on or within the structure, the first antenna configured to emit and receive wireless signals and laid out to transmit and receive according to a wireless communication modality through air, the first position configured to allow the first antenna to transmit and receive trough air;
  laying out a second antenna in a second position on or within the structure, the second antenna configured to emit and receive wireless signals and laid out to transmit and receive according to the wireless communication modality through the body part, the first antenna being tuned differently than the second antenna, the second position spaced apart from the first position and configured to allow the second antenna to transmit and receive trough the body part; and
  disposing a transceiver on or within the structure and operatively coupling the transceiver to the first antenna and the second antenna, the transceiver configured to selectively cause one of the first antenna and the second antenna to communicate with an external antenna of an external system by transmitting and receiving data via the at least one of the first and second antennas according to the wireless communication modality, wherein the transceiver is configured to receive information from the external system and transmit information to the external system.

13. The method of claim 12, wherein the wireless communication modality is one of an ultra high frequency (UHF) communication modality, a near field communication (NFC) modality, or an ISO 15693 modality.

14. The method of claim 12, wherein disposing the transceiver comprises:
  coupling a first transceiver to the first antenna, the first transceiver configured to transmit and receive data according to the wireless communication modality via the first antenna; and
  coupling a second transceiver to the second antenna, the second antenna configured to transmit and receive data according to the wireless communication modality via the second antenna.

15. The method of claim 12, wherein laying out the first antenna, laying out the second antenna, and disposing the transceiver are done on a common substrate, the first and second positions are a common position, and the substrate is positioned in the common position.

16. The method of claim 12, wherein the first and second antennas are discrete components with respect to one another and the first and second positions are separate with respect to one another.

17. The method of claim 12, wherein the information is about at least one of: the wearable article; or a person associated with the wearable article.

18. The method of claim 12, wherein the first and second antennas are further tuned to transmit and receive according to the wireless communication modality through the structure of the article of footwear in addition to through air and the human foot, respectively.

19. The method of claim 12, wherein the information includes visual information related to the article of apparel.

20. The method of claim 12, wherein the structure comprises an upper for an article of footwear and a sole structure, wherein the first and second antennas are positioned on or within the sole structure and the transceiver is positioned on or within the sole structure.

* * * * *